United States Patent
Shih et al.

(10) Patent No.: US 10,589,442 B2
(45) Date of Patent: Mar. 17, 2020

(54) PROCESSING METHOD FOR PRINTING INFORMATION OF POWDER-BED TYPE 3D PRINTING

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Hsueh-Kuan Shih, New Taipei (TW); I-Feng Wu, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 361 days.

(21) Appl. No.: 14/872,412

(22) Filed: Oct. 1, 2015

(65) Prior Publication Data
US 2017/0043498 A1    Feb. 16, 2017

(30) Foreign Application Priority Data
Aug. 12, 2015   (CN) .......................... 2015 1 0489722

(51) Int. Cl.
*B29C 67/00*     (2017.01)
*B28B 1/00*      (2006.01)
(Continued)

(52) U.S. Cl.
CPC ............ *B28B 1/001* (2013.01); *B29C 64/165* (2017.08); *B29C 64/386* (2017.08);
(Continued)

(58) Field of Classification Search
CPC ..... B28B 1/001; B29C 64/386; B29C 64/393; B29C 64/165
See application file for complete search history.

(56) References Cited

U.S. PATENT DOCUMENTS 6,799,959 B1 *  10/2004  Tochimoto .............. B29C 41/12
                                              425/130
2002/0079601 A1 *  6/2002  Russell .................... B29C 41/12
                                              264/40.1
(Continued)

OTHER PUBLICATIONS

Search Report dated Jan. 2, 2017 of the corresponding European patent application.

*Primary Examiner* — Galen H Hauth
(74) *Attorney, Agent, or Firm* — Chun-Ming Shih; HDLS IPR Services

(57) ABSTRACT

A method for processing printing information of a powder-bed type 3D printer is disclosed. The method comprises following steps of: generating a color image and an adhesive image for each printing slice in accordance with a 3D file; adjusting adhesive information of the adhesive image based on color information of the color image; and, generating a final printing image based on the color image and the adjusted adhesive image. The method prevents the 3D printing from jetting adhesive that may overlap with jetted colored ink by using the final printing image, so as to avoid the jetted color-ink being diluted by the adhesive, and powders being moist because of the overlap of the colored ink and the adhesive.

4 Claims, 7 Drawing Sheets

(51) Int. Cl.
*B29C 64/386* (2017.01)
*B29C 64/165* (2017.01)
*G05B 19/4099* (2006.01)
*B33Y 10/00* (2015.01)
*B33Y 50/02* (2015.01)

(52) U.S. Cl.
CPC .......... *G05B 19/4099* (2013.01); *B33Y 10/00* (2014.12); *B33Y 50/02* (2014.12); *G05B 2219/35134* (2013.01); *G05B 2219/49007* (2013.01)

(56) References Cited

U.S. PATENT DOCUMENTS

| | | | |
|---|---|---|---|
| 2004/0188887 A1 | 9/2004 | Kaiai et al. | |
| 2009/0025638 A1* | 1/2009 | Inoue | A61C 13/0019 118/712 |
| 2010/0121476 A1* | 5/2010 | Kritchman | G05B 19/41885 700/119 |

* cited by examiner

PROCESSING METHOD FOR PRINTING INFORMATION OF POWDER-BED TYPE 3D PRINTING

BACKGROUND OF THE INVENTION

1. Technical Field

The technical field relates to a method for processing printing information, and specifically to a processing method for processing printing information of 3D printing.

2. Description of Prior Art

As shown in FIG. 1, FIG. 1 is a schematic diagram of powder-bed type 3D printer of related art. FIG. 1 discloses a powder-bed type 3D printer (refers to as a 3D printer 1 hereinafter), the 3D printer 1 comprises a sprayer 11, a working plane 12 and a forming platform 13 below the working plane 12, wherein the sprayer 11 comprises a plurality of nozzles for respectively jetting color-ink and adhesive.

The powder-bed type 3D printing technology in the related art basically spreads a layer of powder 21 upon the forming platform 12, and uses the sprayer 11 to respectively jet, upon the powder 21, the color-ink for changing the color of the layer of powder 21, and the adhesive for making the layer of powder 21 coheres as a formed model 22. After completing to jet for this layer, the 3D printer 1 controls the forming platform 12 to descend, and spreads next layer of powder 21 upon the adjusted forming platform 12, and then controls the sprayer 11 to jet corresponding color-ink and adhesive upon the next layer of powder 21. In the related art, the 3D printer 1 executes the above actions over and over again, until the formed model 22 is printed completely.

Refer to FIG. 2A and FIG. 2B, which respectively show a schematic diagram of color image of related art and a schematic diagram of adhesive image of related art. When executing printing, the 3D printer 1 jets corresponding colors of ink in accordance with a color image I1, and jets corresponding adhesives in accordance with an adhesive image I2. As shown in FIG. 2A and FIG. 2B, if the formed model 22 to be printed is a sphere having colors on its periphery, the color image I1 may comprise color information 31 which describes a shape corresponding to the shape of the formed model 22 and is distributed with the ink on its periphery. And, the adhesive image I2 may comprise adhesive information 32 which describes a shape corresponding to the shape of the formed model 22 and is filled with the adhesive therein.

Refer to FIG. 2C, which is a schematic diagram of combined image of related art. FIG. 2C discloses a combined image I3 which is combined with the color image I1 and the adhesive image I2, wherein the combined image I3 comprises a forming information 33 which is generated by overlapping the color information 31 and the adhesive information 32. However, the combined image I3 here is just used for an example to describe the status after the combination of the color image I1 and the adhesive image I2, the 3D printer 1 do execute printing by directly jetting the color-ink according to the color image I1 and the adhesive according to the adhesive image I2, but not actually generates the combined image I3. In other words, there is no relation between the color image I1 and the adhesive image I2 when executing printing in the related art.

Based on the forming information 33, when jetting the ink and the adhesive according to the color image I1 and the adhesive image I2 by the 3D printer 1, the periphery part of the formed model 22 will have the ink and the adhesive at the same time, and the center part of the formed model 22 will have the adhesive only. It is to say that the completed formed model 22 comprises a color part and a non-color part, wherein the color part comprises the powder, the ink and the adhesive, and the non-color part only comprises the powder and the adhesive.

Refer to FIG. 3A, FIG. 3B and FIG. 3C, which respectively show schematic diagram of ink droplets distribution, a schematic diagram of adhesive droplets distribution, and a schematic diagram of final distribution of related art. As can be seen in an enlarged view of the color information 31, the color information 31 is consisted of a plurality of ink droplets 41. Also, as can be seen from an enlarged view of the adhesive information 32, the adhesive information 32 is consisted of a plurality of adhesive droplets 42.

The skilled person in this technical field knows that the amount of the jetted ink depends on the color required by the formed model 22 and the depth of the required color. As such, the color information 31 is not filled with the ink droplets 41, and the distributed density of the ink droplets 41 in the color information 31 depends on the depth of the required color. On the other hand, the effect of the adhesive is just to bind the powder 21, so the adhesive information 32 is filled with the adhesive droplets 42 which have the same quality.

As a result, the colored position of the formed model 22 comprises the ink droplets 41 and the adhesive droplets 42 at the same time, i.e., the ink droplets 41 and the adhesive droplets 42 on the colored position are overlapped. In this case, the ink droplets 41 will be diluted by the adhesive on the same position, and the dilution of the ink droplets 41 will degrade the colorful degree of the formed model 22 on the colored position.

Besides, the colored position comprises the ink droplets 41 and the adhesive droplets 42 simultaneously, so the powder 21 on the colored position is much moister, and the expanding degree thereupon increases too.

Furthermore, the colored position of the formed model 22 comprises the ink droplets 41 and the adhesive droplets 42 simultaneously, and the non-colored position of the formed model 22 only comprises the adhesive droplets 42. Therefore, the moisture of the powder 21 on each position are different (i.e., each position has different expanding degrees), so a deformation of the formed model 22 will occur easily.

SUMMARY OF THE INVENTION

The disclosure is directed to a printing information processing method of powder-bed type 3D printer, which can prevent the 3D printer from overlapping ink droplets and adhesive droplets when executing printing.

In one of the exemplary embodiments, the processing method is to generate a color image and an adhesive image required for each of a plurality of printing layers respectively in accordance with an inputted 3D file, to adjust adhesive information of the adhesive image based on color information of the color image, and to generate a final printing image based on the color image and the adjusted adhesive image. Finally, the processing method causes the 3D printer to execute printing for generating a formed model in accordance with the final printing image.

The processing method in this disclosure can prevent the 3D printer from jetting overlapped ink droplets and adhesive droplets when executing printing, therefore, the problem that the ink droplets is diluted by the adhesive droplets and the colorful degree of the formed model is degraded can be solved. Also, the overlapping of the ink droplets and the adhesive droplets not occurs on the same position of the same printing layer, so the problems that the ink droplets are much moister when overlapping with the adhesive droplets, the expanding degree of the powder on the overlapped position increases, and the deformation easily occurs can also be solved.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
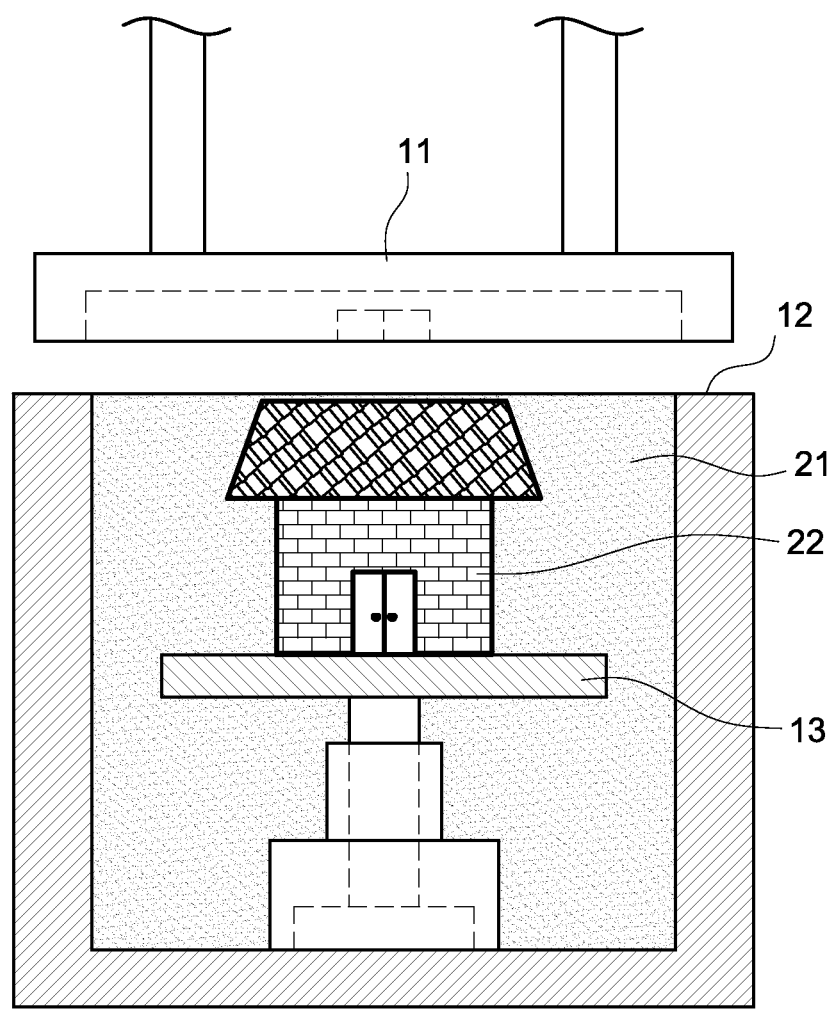
FIG. 1 is a schematic diagram of a powder-bed type 3D printer of related art.
Figure 4:
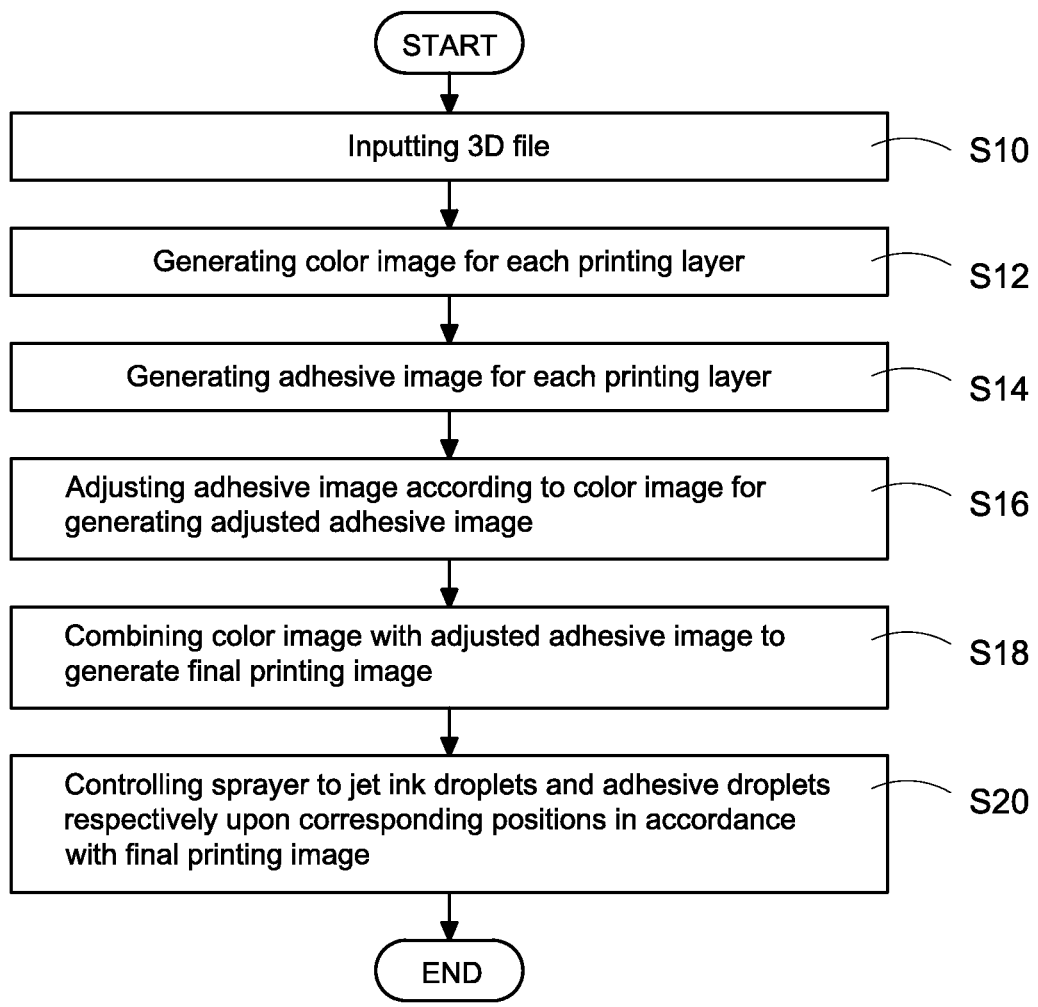
FIG. 4 is an information processing flowchart of a first embodiment according to the present disclosure.

FIG. 4 is an information processing flowchart of a first embodiment according to the present disclosure. The information processing method of the present disclosure is adopted by a powder-bed type 3D printer (such as the 3D printer 1 shown in FIG. 1), and the 3D printer 1 can adjust adhesive information of a formed model (such as the formed model 22 shown in FIG. 1) according to color information of the formed model, so as to solve the problem that the ink droplets and the adhesive droplets overlaps and degrades the colorful degree of the formed model 22, and also to prevent the formed model 22 from being deformed because of the moist and expanding powder.

The 3D printer 1 is first inputted with a 3D file of the formed model 22 through a wired or a wireless way (step S10). A processor (not shown) of the 3D printer 1 executes a slice process to the 3D file (such as a .CAD file) and generates a plurality of printing layers. The slice process can be, for example, a stereolithography (SLA) slice process, but not limited thereto. The slice process set forth above is a known technology in the skilled technical field, further details are not discussed here.

The processor of the 3D printer 1 then generates a color image (such as color image I4 shown in FIG. 5A) for each of the plurality of printing layers respectively based on the 3D file (step S12), and generates an adhesive image (such as adhesive image I5 shown in FIG. 5B) for each of the plurality of printing layers respectively based on the 3D file (step S14). In other words, if the 3D file is sliced into n layers, the 3D printer 1 will generate n color images I4 and n adhesive images I5. However, for easily explaining, the following embodiments will only take one color image I4 and one adhesive image I5 of one printing layer for example, but not intended to limit the scope of the present disclosure.

After generating the color image I4 and the adhesive image I5, the processor of the 3D printer 1 adjusts the content of the adhesive image I5 according to the content of the color image I4, and generates an adjusted adhesive image (such as adjusted adhesive image I5' shown in FIG. 5C)(step S16).

After generating the adjusted adhesive image I5', the processor of the 3D printer 1 combines the color image I4 with the adjusted adhesive image I5 to generate a final printing image I6 (such as final printing image I6 shown in FIG. 5D)(step S18). In this embodiment, the final printing image I6 is corresponding to the current printing layer to be printed by the 3D printer 1. After the step S18, the processor of the 3D printer 1 controls the sprayer (such as the sprayer 11 shown in FIG. 1) to jet ink droplets and adhesive droplets (such as ink droplets 61 and adhesive droplets 62 shown in FIG. 5A to FIG. 5D) respectively upon the corresponding positions in accordance with the final printing image I6 (step S20).

It should be mentioned that the processor of the 3D printer 1 can adjust all adhesive images I5 of all printing layers at first, and then executes the printing procedure after completing to generate all of the final printing images I6 for all printing layers. However, the processor of the 3D printer 1 can also dynamically adjust the adhesive image I5 and generate the final printing image I6 for a corresponding printing layer just before starting to print the corresponding printing layer, it is to say that the execution order is not limited thereto.

Figure 2A:
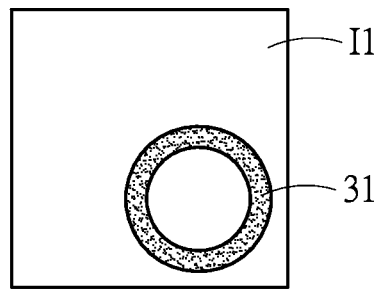
FIG. 2A is a schematic diagram of color image of related art.
Figure 2B:
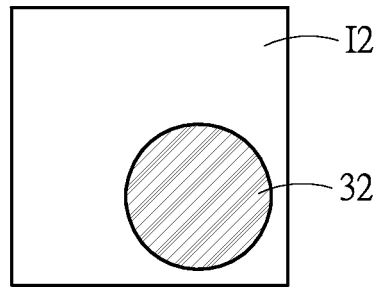
FIG. 2B is a schematic diagram of adhesive image of related art.
Figure 2C:
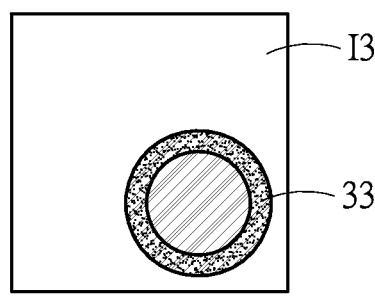
FIG. 2C is a schematic diagram of combined image of related art.
Figure 3A:
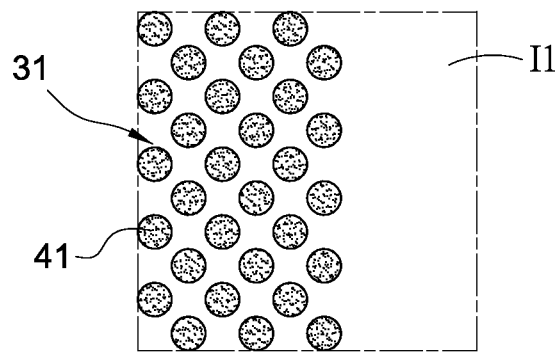
FIG. 3A is a schematic diagram of ink droplets distribution of related art.
Figure 3B:
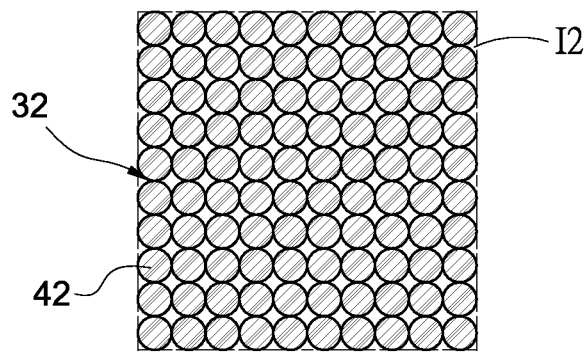
FIG. 3B is a schematic diagram of adhesive droplets distribution of related art.
Figure 3C:
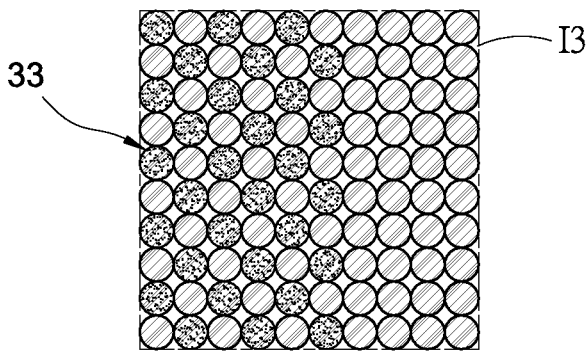
FIG. 3C is a schematic diagram of final distribution of related art.

The main technical feature of the present embodiment is that the 3D printer 1 controls the sprayer 11 to respectively jet the ink droplets 61 and the adhesive droplets 62 upon the corresponding positions of the printing layer according to a single final printing image I6. As such, the technical solution in this embodiment is different from that of the related art that the 3D printer 1 jets the ink droplets 61 according to a color image and jets the adhesive droplets 62 according to an adhesive image respectively (such as the color image I1 and the adhesive image I2 shown in FIG. 2A and FIG. 2B).

Figure 5A:
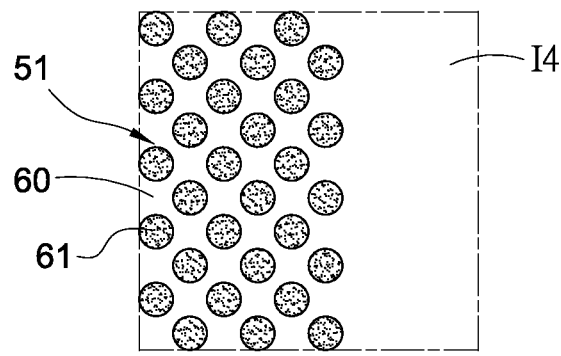
FIG. 5A is a schematic diagram of ink distribution of a first embodiment according to the present disclosure.
Figure 5B:
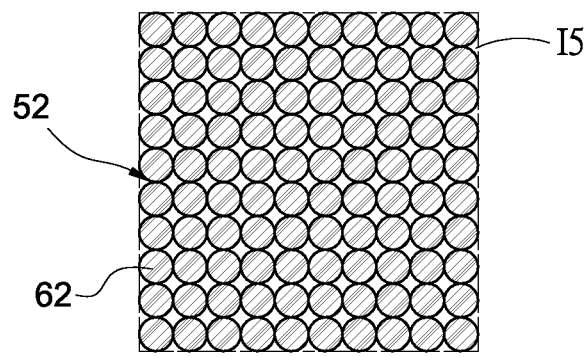
FIG. 5B is a schematic diagram of adhesive distribution of a first embodiment according to the present disclosure.
Figure 5C:
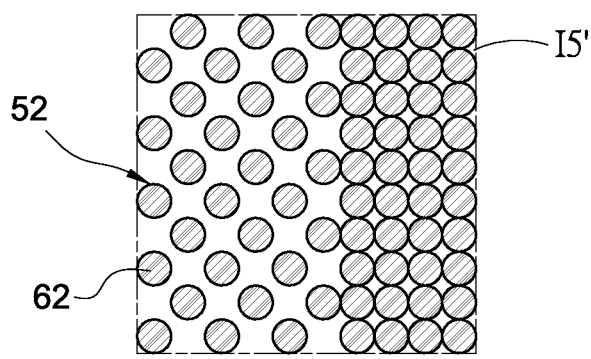
FIG. 5C is a schematic diagram of adjusted adhesive distribution of a first embodiment according to the present disclosure.
Figure 5D:
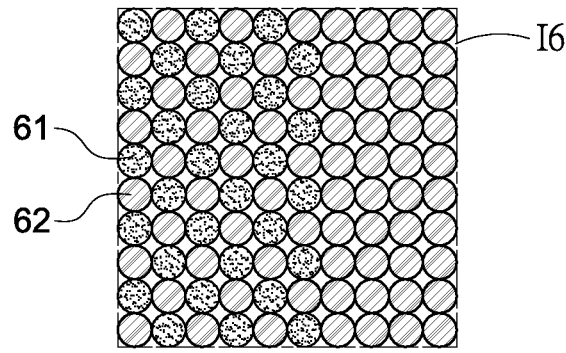
FIG. 5D is a schematic diagram of final distribution of a first embodiment according to the present disclosure.

Refer to FIG. 5A, FIG. 5B, FIG. 5C and FIG. 5D, wherein FIG. 5A is a schematic diagram of ink droplets distribution of a first embodiment according to the present disclosure, FIG. 5B is a schematic diagram of adhesive droplets distribution of a first embodiment according to the present disclosure, FIG. 5C is a schematic diagram of adjusted adhesive distribution of a first embodiment according to the present disclosure, FIG. 5D is a schematic diagram of final distribution of a first embodiment according to the present disclosure.

As shown in FIG. 5A, the color image I4 comprises color information 51 equipped by the formed model 22 in the printing layer, wherein the color information 51 is consisted of a plurality of ink droplets 61. As shown in FIG. 5B, the adhesive image I5 comprises adhesive information 52 equipped by formed model 22 in the printing layer, wherein the adhesive information 52 is consisted of a plurality of adhesive droplets 62.

In the step S16 of FIG. 4 set forth above, the processor of the 3D printer 1 adjusts the adhesive information 52 of the adhesive image I5 according to the color information 51 of the color image I4 for generating the adjusted adhesive image I5'. In particularly, the processor is to adjust the amount and the position of the adhesive droplets 62 of the adhesive information 52 according to the amount and the position of the ink droplets 61 of the color information 51.

With reference to FIG. 5A, as can be seen from an enlarged view of the color information 51 of the color image I4 and from pixel aspect, the color information 51 is consisted of the plurality of ink droplets 61. As such, if the amount of the plurality of ink droplets 61 is less, the gaps 60 between each ink droplet are much wider, and the density of the plurality of ink droplets 61 in each unit area is smaller, then the constituted color is lighter (such as a light red); On the contrary, if the amount of the plurality of ink droplets 61 is much more, the gaps 60 between each ink droplet 61 are narrower, and the density of the plurality of ink droplets 61 in each unit area is larger, then the constituted color is deeper (such as a deep red).

As mentioned above, depending on the color required by the printing layer, some parts of the printing layer are distributed with the ink droplets 61 and some parts are not (i.e., becomes the gaps 60 mentioned above). Usually, the color information 51 is not 100% filled with the plurality of ink droplets 61.

With reference to FIG. 5B, as can be seen from an enlarged view of the adhesive information 52 of the adhesive image I5 and from pixel aspect, the adhesive information 52 is consisted of the plurality of adhesive droplets 62. However, the adhesive is just used to bind the powder of the current printing layer, an upper layer and a lower layer (such as the powder 21 shown in FIG. 1), and is irrelative with the color of the formed model 22. Therefore, the 3D printer 1 generally preset the shape of the adhesive information 52 corresponding to the shape of the formed model 22 in the printing layer, and 100% fills the adhesive information 52 with the plurality of adhesive droplets 62. In other words, there ain't any gap 60 in the adhesive information 52, so the strength of the formed model 22 can be ensured.

The technical feature of the present embodiment is to prevent the printing procedure from jetting the ink droplets 61 and the adhesive droplets 62 on the same position of the same printing layer. In other words, the present embodiment is to ensure the adhesive droplets 62 are distributed on the positions where the ink droplets 61 are not distributed upon (i.e., the positions of the gaps 60). It should be mentioned that the powder adopted by the 3D printer 1 is gypsum powder. The skilled person in the technical field knows that the gypsum powder is adhesive after absorbing water. As such, even the positions where the ink droplets 61 are jetted are not distributed with the adhesive droplets 62, the gypsum powder at that positions is dyed and becomes adhesive after absorbing the ink droplets 61. As a result, it won't be a problem that the gypsum powder at that positions cannot be binded together because of the lack of the adhesive droplets 62.

In this embodiment, the processor of the 3D printer 1 executes an "exclusive or" calculation to the plurality of ink droplets 61 of the color information 51 and the plurality of adhesive droplets 62 of the adhesive information 52, so as to adjust the amount and position of the plurality of adhesive droplets 62 of the adhesive information 52.

As shown in FIG. 5C, after the "exclusive or" calculation, the processor of the 3D printer 1 can ensure that the positions distributed with the ink droplets 61 in the adjusted adhesive image I5' are not distributed with the adhesive droplets 62, i.e., the adhesive droplets 62 are only distributed on the gaps 60, which are not distributed with the ink droplets 61. As shown in FIG. 5D, the final printing image I6 does not have any gap 60, and the plurality of ink droplets 61 and the plurality of adhesive droplets 62 of the final printing image I6 are not overlapped.

As such, when the 3D printer 1 controls the sprayer 11 to jet the plurality of ink droplets 61 and the plurality of adhesive droplets 62 for the printing layer according to the final printing image I6, the overlapping situation in the related art will not occur. In this embodiment, the problem of ink droplets 61 diluted by the overlapped adhesive droplets 62 and degraded colorful degree in the formed model 22 does not exist. Besides, the above embodiment can ensure the moisture of the powder 21 on each position is averaged, so the problem of the deformation of the formed model 22 caused by different moistures and different expanding degrees does not exist, too.

Figure 6:
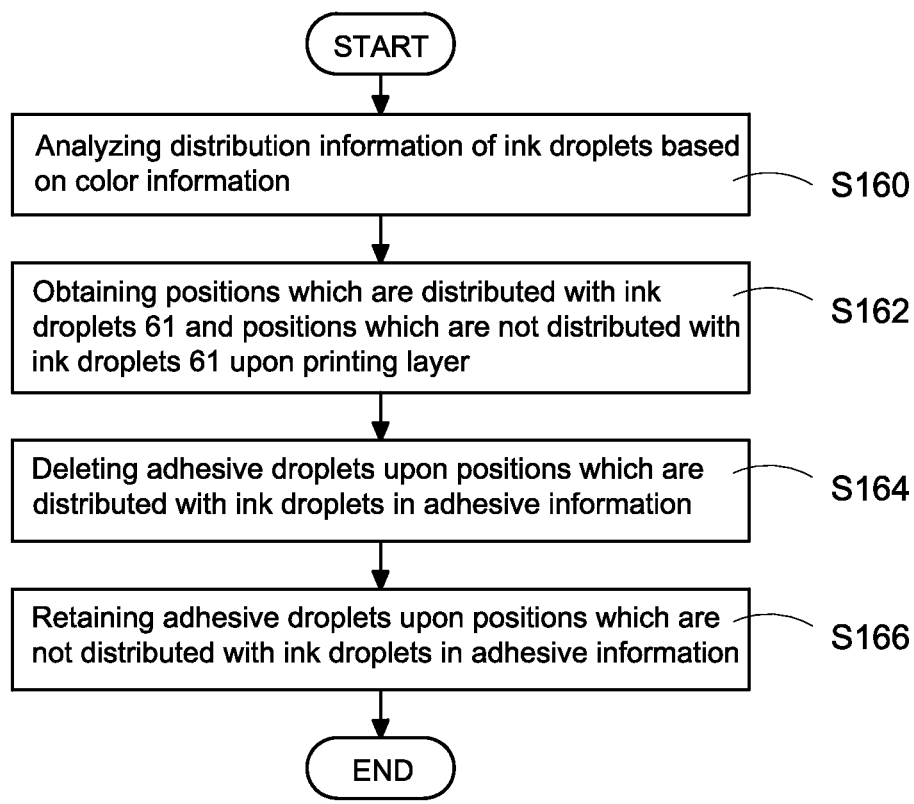
FIG. 6 is an adhesive image adjusting flowchart of a first embodiment according to the present disclosure.

FIG. 6 is an adhesive image adjusting flowchart of a first embodiment according to the present disclosure. FIG. 6 is used to describe in detail the adjusting steps for adjusting the adhesive image I5 of the step S16 in the FIG. 4.

The processor of the 3D printer 1 first obtains the color information 51 of the color image I4, and analyzes the distribution information of the plurality of ink droplets 61 based on the color information 51 (step S160). Then, the processor obtains the positions which are distributed with the plurality of ink droplets 61 upon the printing layer, and obtains the positions which are not distributed with the plurality of ink droplets 61 upon the printing layer (step S162).

After the step S162, the processor deletes the adhesive droplets 62 upon the positions which are distributed with the ink droplets 61 in the adhesive information 52 (step S164), and retains the adhesive droplets 62 upon the positions which are not distributed with the ink droplets 61 in the adhesive information 52 (step S166). It finally generates the adjusted adhesive image I5' according to the adhesive information 52 which has processed with the deleting action and the retaining action, and uses the adjusted adhesive image I5' to execute the following actions.

It should be mentioned that the color-ink adopted by the 3D printer 1 is composed of multiple fundamental inks in different colors (cyan, magenta and yellow, in general). When executing printing, the 3D printer 1 controls the color of the formed model 22 by adjusting the percentage of these three color-inks Generally, the powder 21 absorbs the ink droplets 61 for dyeing and absorbs the adhesive droplets 62 for cohesion.

As mentioned above, if the ink droplets 61 have deeper color (such as black), the volume of the ink droplets 61 is larger because the ink droplets 61 are composed of multiple foundational inks in different colors, and the moisture of the ink droplets 61 is much higher, too. On the contrary, if the droplets 61 have lighter color (such as cyan), the volume of the ink droplets 61 is smaller because the ink droplets 61 are not composed of multiple colors of fundamental ink or composed of only two colors of fundamental ink, and the moisture of the ink droplets 61 is lower then.

As discussed above, the moisture of the powder 21 will affect its expanding degree. If the powder 21 on a certain position absorbs the ink droplets 61 having the higher moisture, even the certain position is not distributed with the adhesive droplets 62, the powder 21 thereon may still cause the deformation of the formed model 22 because of the large expanding degree.

Figure 7:
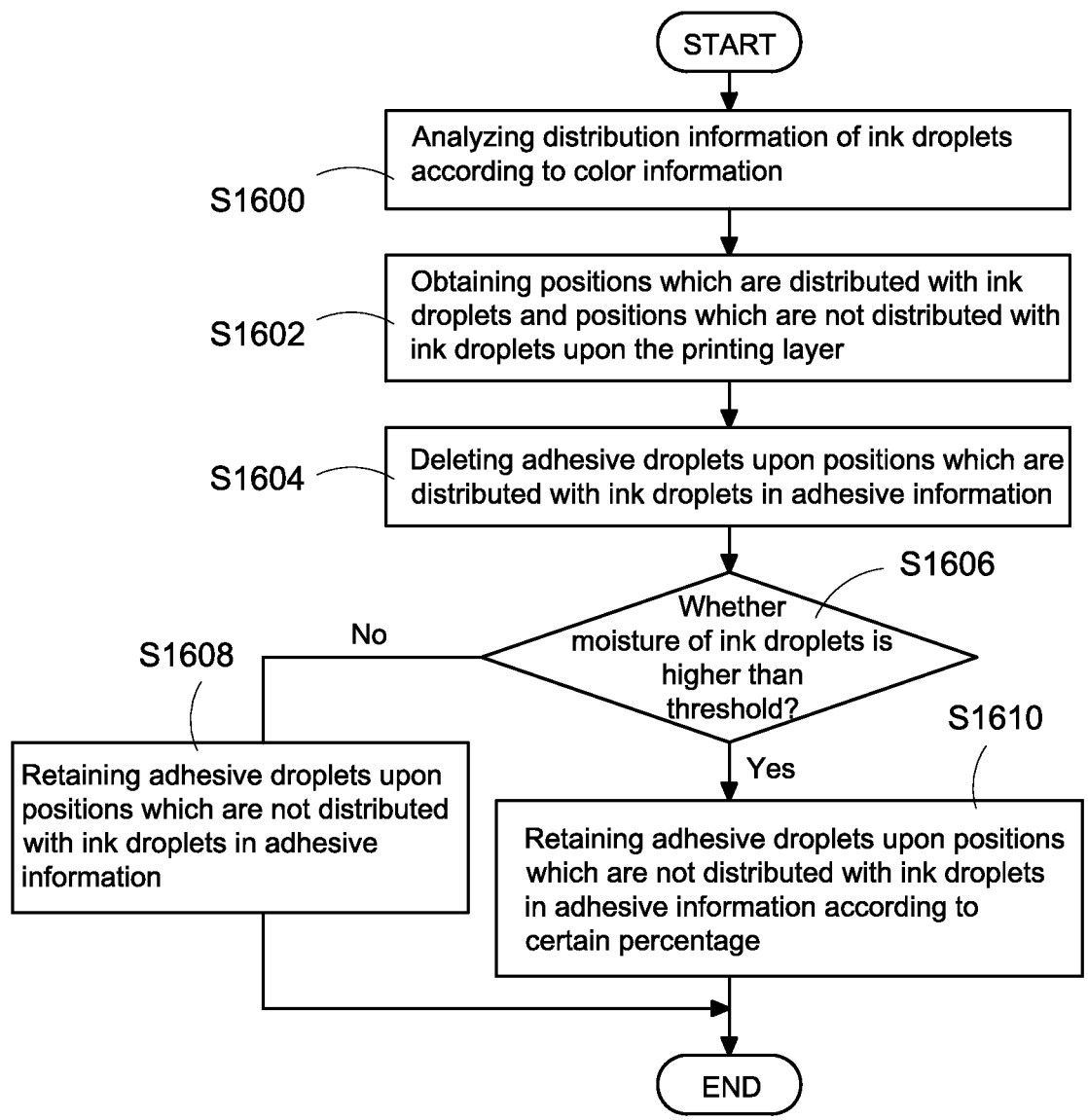
FIG. 7 is an adhesive image adjusting flowchart of a second embodiment according to the present disclosure.

FIG. 7 is an adhesive image adjusting flowchart of a second embodiment according to the present disclosure. FIG. 7 is used to describe in detail other adjusting steps for adjusting the adhesive image I5 of the step S16 set forth in the FIG. 4.

The processor of the 3D printer 1 analyzes the distribution information of the plurality of ink droplets 31 according to the color information 51 (step S1600), and then obtains the positions which are distributed with the plurality of ink droplets 61 upon the printing layer, and also obtains the positions which are not distributed with the plurality of ink droplets 61 upon the printing layer (step S1602). Further, the processor deletes the plurality of adhesive droplets 62 upon the positions which are distributed with the plurality of ink droplets 61 in the adhesive information 52 (step S1604).

After the step S1604, the processor determines whether the moisture of the plurality of ink droplets 61 is higher than a threshold or not (step S1606). In this embodiment, the threshold is used to judge whether the powder 21 will expand too much after absorbing those ink droplets 61. If the moisture of the ink droplets 61 is determined to be not higher than the threshold, the adhesive droplets 62 upon the positions which are not distributed with the ink droplets 61 are retained in the adhesive information 52 (step S1608), i.e., distributes the adhesive droplets 62 upon the positions where the gaps 62 exist in the color information 51.

After the step S1608, the processor executes the deleting action and the retaining action for the adhesive information 52 for generating the adjusted adhesive image I5' and to execute the following actions.

In this embodiment, the processor of the 3D printer 1 can determine whether the moisture of the ink droplets 61 is higher than the threshold based on the color shade of the ink droplets 61, or based on the density of the ink droplets 61 in the color information 51, but not limited thereto.

If the moisture of the ink droplets 61 is determined to be higher than the threshold in the step S1606, the processor of the 3D printer 1 retains the adhesive droplets 62 upon the positions which are not distributed with the ink droplets 61 in the adhesive information 52 according to a certain percentage (step S1610). In other words, the positions which are distributed with the ink droplets 61 are not distributed with the adhesive droplets 62, and the positions which are not distributed with the ink droplets 61 are distributed with the adhesive droplets 62 and the gaps 60 simultaneously according to the above mentioned certain percentage.

In this embodiment, the certain percentage is inversely proportional to the moisture of the ink droplets 61. In particularly, if the moisture of the ink droplets 61 is much higher, the amount of the adhesive droplets 62 retained surrounding the ink droplets 61 is less (i.e., the gaps 60 are much wider). On the contrary, if the moisture of the ink droplets 61 is lower, the amount of the adhesive droplets 62 retained surrounding the ink droplets 61 is much more (i.e., the gaps 60 are narrower). However, the above description is just an embodiment of the present disclosure, not intended to limit the scope of the present invention.

Figure 8:
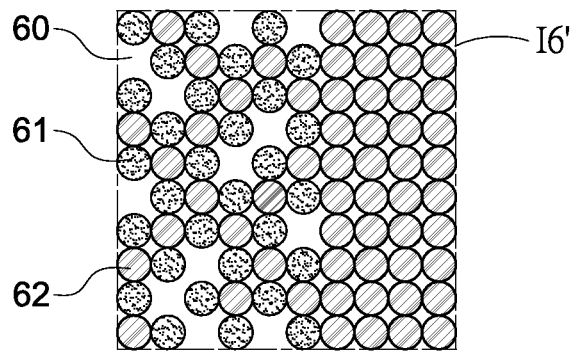
FIG. 8 is a schematic diagram of final distribution of a second embodiment according to the present disclosure.

FIG. 8 is a schematic diagram of final distribution of a second embodiment according to the present disclosure. FIG. 8 discloses other final printing image I6' which is different from the final printing image I6 disclosed in FIG. 5D. As shown in FIG. 8, the ink droplets 61 and the adhesive droplets 62 of the final printing image I6' are still not overlapped, but there are some gaps 60 are retained surrounding the ink droplets 61, and not filled with the adhesive droplets 62.

In this embodiment, the retained gaps 60 can provide some spaces for the powder 21 to expand after absorbing the ink droplets 61 having higher moisture, so as to prevent the formed model 22 from deformation caused by the expanding of the powder 21.

As the skilled person will appreciate, various changes and modifications can be made to the described embodiment. It is intended to include all such variations, modifications and equivalents which fall within the scope of the present invention, as defined in the accompanying claims.

What is claimed is:

1. A processing method for printing information of powder-bed type 3D printing, comprising:
   a) generating a color image for a printing layer, wherein the color image comprises color information having a plurality of ink droplets and a plurality of gaps between each of the ink droplets;
   b) generating an adhesive image for the printing layer, wherein the adhesive image comprises adhesive information filled with a plurality of adhesive droplets and no space exists between any two adjacent adhesive droplets;
   c) adjusting the adhesive information of the adhesive image for generating an adjusted adhesive image according to the color information of the color image;
   d) generating a final printing image via combining the color image with the adjusted adhesive image; and
   e) controlling a sprayer of a 3D printer to respectively jet the ink droplets and the adhesive droplets upon corresponding positions in accordance with the final printing image,
   wherein the step c is to adjust the adhesive information of the adhesive image through executing an "exclusive or" calculation to the plurality of ink droplets of the color information and the plurality of adhesive droplets of the adhesive information, so the adhesive droplets in the adjusted adhesive image are only distributed on positions with respect to the gaps in the color image, and the step c comprises steps of:
   c11) analyzing distribution information of the plurality of ink droplets according to the color information;
   c12) obtaining positions which are distributed with the ink droplets and other positions which are not distributed with the ink droplets;
   c13) deleting the adhesive droplets upon the positions which are distributed with the ink droplets in the adhesive information;
   c14) determining whether moisture of the ink droplets will cause powder to expand and lead to deformation of a model according to color shade of the ink droplets in each unit area of the color information;
   c15) retaining only parts of the adhesive droplets upon the positions which are not distributed with the ink droplets in the adhesive information if the moisture of the ink droplets will cause powder to expand and lead to deformation of the model; and c16) generating the adjusted adhesive image according to the adhesive information which is processed with a deleting action;

wherein, the final printing image is consisted of the plurality of ink droplets, the plurality of adhesive droplets and a plurality of gaps generated from the deleting action, and the amount of the gaps in the final printing image is corresponding to the moisture of the plurality of ink droplets.

2. The processing method in claim 1, wherein further comprises a step f before the step a): inputting a 3D file, wherein the 3D file comprises multiple of the printing layer.

3. The processing method in claim 1, wherein the step c14 is to determine if the moisture of the ink droplets will cause powder to expand and lead to deformation of a model according to density of the ink droplets in each unit area of the color information.

4. A processing method for printing information of powder-bed type 3D printing, comprising:
   a) generating a color image for a printing layer, wherein the color image comprises color information having a plurality of ink droplets;
   b) generating an adhesive image for the printing layer, wherein the adhesive image comprises adhesive information having a plurality of adhesive droplets;
   c) adjusting the adhesive information of the adhesive image for generating an adjusted adhesive image according to the color information of the color image, and comprising:
   c11) analyzing distribution information of the plurality of ink droplets according to the color information;
   c12) obtaining positions which are distributed with the ink droplets and other positions which are not distributed with the ink droplets;
   c13) deleting the adhesive droplets upon the positions which are distributed with the ink droplets in the adhesive information;
   c14) determining whether moisture of the ink droplets will cause powder to expand and lead to deformation of a model according to color shade of the ink droplets in each unit area of the color information;
   c15) retaining all of the adhesive droplets upon the positions which are not distributed with the ink droplets in the adhesive information if the moisture of the ink droplets will not cause powder to expand and lead to deformation of the model;
   c16) generating the adjusted adhesive image according to the adhesive information which is processed with a deleting action in step c15);
   d) generating a final printing image via combining the color image with the adjusted adhesive image, wherein the final printing image is consisted of the plurality of ink droplets and the plurality of adhesive droplets and without any gap; and
   e) controlling a sprayer of a 3D printer to respectively jet the ink droplets and the adhesive droplets upon corresponding positions in accordance with the final printing image, wherein the step c is to adjust the adhesive information of the adhesive image through executing an "exclusive or" calculation to the plurality of ink droplets of the color information and the plurality of adhesive droplets of the adhesive information.

* * * * *